(12) United States Patent
Clementi

(10) Patent No.: US 8,284,816 B1
(45) Date of Patent: Oct. 9, 2012

(54) PUSH-PULL SPREAD SPECTRUM CLOCK SIGNAL GENERATOR

(75) Inventor: Daniel M. Clementi, Doylestown, PA (US)

(73) Assignee: Integrated Device Technology, Inc., San Jose, CA (US)

(*) Notice: Subject to any disclaimer, the term of this patent is extended or adjusted under 35 U.S.C. 154(b) by 800 days.

(21) Appl. No.: 12/476,177

(22) Filed: Jun. 1, 2009

(51) Int. Cl.
*H04B 1/00* (2006.01)

(52) U.S. Cl. ........ 375/130; 375/131; 375/294; 375/327; 375/373; 375/376; 331/16; 327/156; 327/250

(58) Field of Classification Search ............. 375/130, 375/131–132, 135, 136, 140, 145–147, 294, 375/327, 354, 371, 373–376
See application file for complete search history.

(56) References Cited

U.S. PATENT DOCUMENTS

| | | | |
|---|---|---|---|
| 5,610,955 A | | 3/1997 | Bland |
| 6,046,646 A * | | 4/2000 | Lo et al. ................. 331/10 |
| 6,292,507 B1 * | | 9/2001 | Hardin et al. ............ 375/130 |
| 6,407,642 B2 | | 6/2002 | Dosho et al. |
| 6,658,043 B2 * | | 12/2003 | Hardin et al. ............ 375/130 |
| 6,665,019 B1 | | 12/2003 | Pronkine |
| 7,482,880 B2 * | | 1/2009 | Herrin et al. ............ 331/1 A |
| 7,508,278 B2 * | | 3/2009 | Chen ....................... 331/78 |
| 7,512,205 B1 * | | 3/2009 | Erol ....................... 375/376 |
| 7,580,443 B2 * | | 8/2009 | Uemura et al. ........... 375/130 |
| 7,912,109 B1 * | | 3/2011 | Li ......................... 375/130 |
| 7,917,796 B2 * | | 3/2011 | Wilson .................... 713/500 |
| 7,973,780 B2 * | | 7/2011 | Hwangbo et al. ......... 345/204 |
| 8,009,719 B2 * | | 8/2011 | Shao et al. ............... 375/130 |
| 8,041,310 B2 * | | 10/2011 | Nilsson et al. ........... 455/76 |
| 8,164,367 B1 * | | 4/2012 | Bal et al. ................. 327/157 |
| 8,174,326 B1 * | | 5/2012 | Li ......................... 331/23 |
| 2006/0023770 A1 * | | 2/2006 | Kuo ....................... 375/130 |
| 2008/0239147 A1 | | 10/2008 | Kung et al. |

* cited by examiner

*Primary Examiner* — Hirdepal Singh
(74) *Attorney, Agent, or Firm* — Kenneth Glass; Stanley J. Pawlik; Glass & Associates

(57) ABSTRACT

A spread spectrum clock signal generator modulates a reference clock signal based on a spread spectrum frequency profile and includes a phase-lock loop for generating a spread spectrum clock signal by aligning a phase of the modulated reference clock signal with a phase of the spread spectrum clock signal. The spread spectrum clock signal generator also includes a loop modulator for modulating the spread spectrum clock signal based on the spread spectrum frequency profile. Because the spread spectrum clock signal generator modulates both the reference clock signal and the spread spectrum clock signal based on the spread spectrum frequency profile, the spread spectrum clock signal has a non-distorted frequency profile and low phase jitter.

20 Claims, 12 Drawing Sheets

PUSH-PULL SPREAD SPECTRUM CLOCK SIGNAL GENERATOR

BACKGROUND

A spread spectrum clock signal is employed in many modern electronic devices. In these electronic devices, a spread spectrum clock signal generator generates a spread spectrum clock signal by spreading a frequency of a reference clock signal over a frequency range. As a result, energy of the reference clock signal is spread over the frequency range of the spread spectrum clock signal. Because the energy is spread over the frequency range of the spread spectrum clock signal, a peak electromagnetic interference emitted by the spread spectrum clock signal is less than a peak electromagnetic interference emitted by the reference clock signal. The spread spectrum clock signal may then be provided to components of the electronic device through an unshielded cable without exceeding electromagnetic interference requirements established for the electronic device by the Federal Communications Commission (FCC).

Techniques for generating a spread spectrum clock signal typically employ a phase-lock loop. In one such technique, a modulated reference clock signal is generated by using a fractional-N divider to modulate a reference clock signal based on a modulation frequency profile. The fractional-N divider, however, may cause undesired high-frequency quantization noise in the modulated reference clock signal. Moreover, a phase-lock loop generates the spread spectrum clock signal by low-pass filtering the modulated reference clock signal. As a result, relatively low-frequency phase modulation components of the modulation frequency profile are passed by the phase-lock loop and undesired high-frequency phase quantization noise is attenuated by the phase locked loop. In this technique, selection of the loop bandwidth of the phase locked loop involves compromise because it may not be possible to simultaneously achieve a satisfactory reduction in quantization noise and pass essential frequency components of the spread spectrum frequency profile to avoid distortion of the spread spectrum frequency profile in the spread spectrum clock signal.

In another technique for generating a spread spectrum clock signal, a current is injected into a low-pass filter of the phase-lock loop to directly modulate a control input of a voltage-controlled oscillator in the phase-lock loop based on a modulation frequency profile. Moreover, the phase-lock loop generates a spread spectrum clock signal having the modulation frequency profile. In this technique, a negative feedback action of the phase-lock loop creates a high-pass transfer function from the point at which the current is injected into the low-pass filter to the output of the phase-lock loop. It is therefore necessary to set the loop bandwidth of the phase-lock loop to a frequency lower than the fundamental modulation frequency of the modulation frequency profile. In this way, the phase-lock loop will pass frequencies above the loop bandwidth that are present in the modulation profile and the modulation frequency profile of the spread spectrum clock signal will not be distorted. A low loop bandwidth of the phase locked loop, however, is undesirable for several reasons. First, the ability of the phase-lock loop to reject undesired influences, such as power supply modulation effects and voltage controlled oscillator phase noise, is degraded. Second, a loop phase detector of the phase-lock loop generates a phase error signal indicating that phase modulation of the spread spectrum clock signal is a phase error. Moreover, the loop phase detector converts the phase error to undesired frequencies which may not be sufficiently attenuated by low pass filtering action of the phase locked loop, resulting in undesired phase jitter in the spread spectrum clock signal. This result occurs because the loop phase detector samples phase error.

In light of the above, a need exists for an improved system and method of generating a spread spectrum clock signal. A further need exists for generating a spread spectrum clock signal having a non-distorted frequency profile and low phase jitter.

SUMMARY

In various embodiments, a clock signal generator includes a reference clock signal modulator for modulating a reference clock signal based on a spread spectrum frequency profile. The clock signal generator also includes a phase-lock loop for generating a spread spectrum clock signal based on the modulated reference clock signal. The phase-lock loop generates the spread spectrum clock signal by locking a phase of the spread spectrum clock signal with a phase of the modulated reference clock signal. Moreover, the phase-lock loop has a loop bandwidth, which reduces quantization noise of the modulated reference clock signal that may cause jitter in the spread spectrum clock signal. The clock signal generator also includes a loop modulator for modulating the modulated reference clock signal in the phase-lock loop based on a loop frequency profile. Moreover, the loop modulator modulates the modulated reference clock signal such that the spread spectrum clock signal has the spread spectrum frequency profile. As a result, the spread spectrum clock signal has a non-distorted frequency profile and low phase jitter.

A spread spectrum clock signal generator, in accordance with one embodiment, includes a reference clock signal modulator, a phase-lock loop, and a loop modulator. The reference clock signal modulator is coupled to the phase-lock loop and the loop modulator. Additionally, the loop modulator is coupled to the phase-lock loop. The reference clock signal modulator is configured to generate a modulated reference clock signal by modulating a reference clock signal based on a spread spectrum frequency profile. The reference clock signal modulator is further configured to generate a modulation direction signal indicating a modulation frequency direction of the spread spectrum frequency profile. The phase-lock loop is configured to generate a loop phase error signal indicating a phase difference between the modulated reference clock signal and a spread spectrum clock signal. The phase-lock loop is further configured to generate the spread spectrum clock signal based on the modulated reference clock signal and a loop modulation signal. The loop modulator is configured to generate the loop modulation signal based on the modulation direction signal and the loop phase error signal for minimizing a phase-modulation amplitude difference between a phase-modulation amplitude of the modulated reference clock signal and a phase-modulation amplitude of the spread spectrum clock signal.

A system for generating a spread spectrum clock signal, in accordance with one embodiment, includes a profile generator, a sequencer, a frequency divider, a loop phase detector, a loop modulator, a loop charge pump, a loop filter, and a loop voltage-controlled oscillator. The sequencer is coupled to the profile generator and the frequency divider is coupled to the sequencer. Additionally, the loop phase detector is coupled to the frequency divider, the loop modulator is coupled to the profile generator and the loop phase detector, and the loop charge pump is coupled to the loop phase detector. The loop voltage-controlled oscillator is coupled to the loop filter and the loop phase detector. The profile generator is configured to generate a spread spectrum profile signal indicating a spread spectrum frequency profile and a modulation direction signal indicating a modulation frequency direction of the spread spectrum frequency profile. The sequencer is configured to generate a sequencing signal based on the modulation direction signal. The sequencing signal indicates a sequence of divisors for dividing a frequency of the reference clock signal. The frequency divider is configured to generate a modulated reference clock signal by dividing a fundamental frequency of the reference clock signal by the sequence of divisors indicated by the sequencing signal. The loop phase detector is configured to generate a loop phase error signal indicating a phase difference between the modulated reference clock signal and the spread spectrum clock signal. The loop modulator is configured to generate a loop modulation signal based on the modulation control signal and the loop phase error signal for minimizing a phase-modulation amplitude difference between a phase-modulation amplitude of the modulated reference clock signal and a phase-modulation amplitude of the spread spectrum clock signal. The loop charge pump is configured to generate a loop charge pump signal based on the loop phase error signal. The loop charge pump signal indicates the phase difference between the modulated reference clock signal and the spread spectrum clock signal. The loop filter is configured to generate a loop oscillation control signal by low-pass filtering the loop charge pump signal and combining the loop charge pump signal with the loop modulation signal. The loop voltage-controlled oscillator is configured to generate the spread spectrum clock signal based on the loop oscillation control signal.

A method of generating a spread spectrum clock signal, in accordance with one embodiment, includes receiving a reference clock signal and generating a modulated reference clock signal by modulating the reference clock signal based on a spread spectrum frequency profile. The method further includes generating a modulation direction signal indicating a modulation frequency direction of the spread spectrum frequency profile. Additionally, the method includes generating a loop phase error signal indicating a phase difference between the modulated reference clock signal and the spread spectrum clock signal. Further, the method includes generating a loop modulation signal based on the modulation direction signal and the loop phase error signal for minimizing a phase-modulation amplitude difference between a phase-modulation amplitude of the modulated reference clock signal and a phase-modulation amplitude of the spread spectrum clock signal. The method also includes generating the spread spectrum clock signal based on the modulated reference clock signal and the loop modulation signal.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a spread spectrum clock signal generator modulates a reference clock signal based on a spread spectrum frequency profile and includes a phase-lock loop for generating a spread spectrum clock signal by aligning a phase of the modulated reference clock signal with a phase of the spread spectrum clock signal. The spread spectrum clock signal generator also includes a loop modulator for modulating the spread spectrum clock signal based on the spread spectrum frequency profile. Because the spread spectrum clock signal generator modulates both the reference clock signal and the spread spectrum clock signal based on the spread spectrum frequency profile, the spread spectrum clock signal has a non-distorted frequency profile and low phase jitter.

Figure 1:
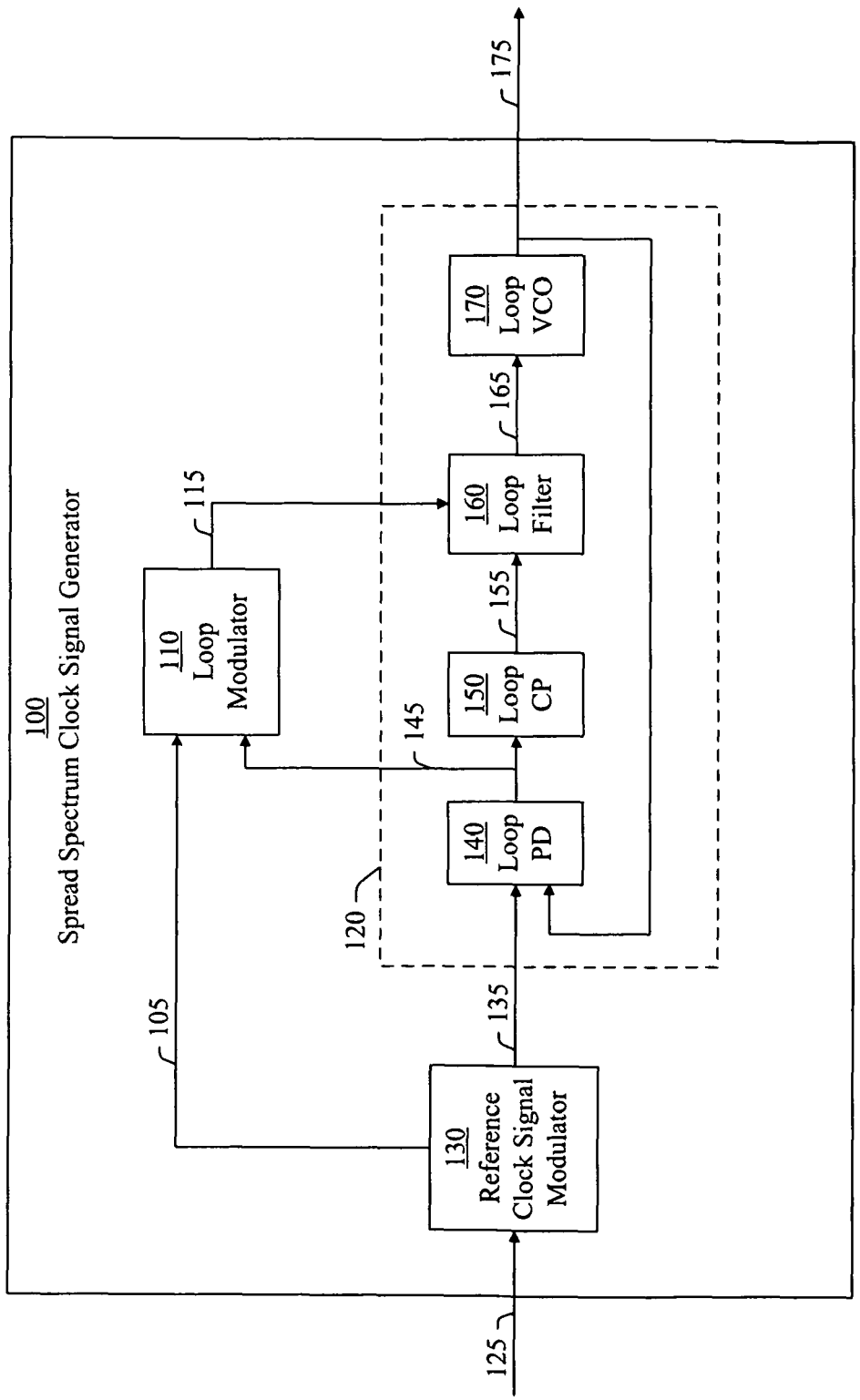
FIG. 1 is a block diagram of spread spectrum clock signal generator, in accordance with an embodiment of the present invention.

FIG. 1 illustrates a spread spectrum clock signal generator 100, in accordance with an embodiment of the present invention. The spread spectrum clock signal generator 100 generates a spread spectrum clock signal 175 based on a reference clock signal 125 by spreading a fundamental frequency of the reference clock signal 125 across a frequency range. As a result, the spread spectrum clock signal 175 emits reduced peak electromagnetic interference (EMI) in comparison to the reference clock signal 125 when transmitted through an electrical conductor. Moreover, the spread spectrum clock signal 175 may be employed in an electronic device without exceeding a peak electromagnetic interference requirement (e.g., specification) of the electronic device. For example, the spread spectrum clock signal 175 may be provided to an electronic component of an electronic device through an unshielded electrical conductor, such as an unshielded cable, without exceeding the peak electromagnetic interface requirement of the electronic device. In various embodiments, the spread spectrum clock signal generator 100 is implemented in a single semiconductor die. In other embodiments, the spread spectrum clock signal generator 100 is implemented in more than one semiconductor die. For example, the spread spectrum clock signal generator 100 may be implemented in multiple semiconductor die packaged in a multichip package.

The spread spectrum clock signal generator 100 includes a reference clock signal modulator 130, a loop modulator 110, and a phase-lock loop 120. The phase-lock loop 120 is coupled (e.g., connected) to both the reference clock signal modulator 130 and the loop modulator 110. The reference clock signal modulator 130 generates a modulated reference clock signal 135 by modulating the reference clock signal 125 based on a spread spectrum frequency profile. In various embodiments, the spread spectrum frequency profile has a triangular shape and a frequency that varies across a frequency range symmetrically about a fundamental frequency. For example, the reference clock signal 125 may have a frequency of 800 MHz and the reference clock signal modulator 130 may generate the modulated reference clock signal 135 at an average frequency of 10 MHz over a frequency range of 9.95 MHz to 10.05 MHz at a fundamental modulation frequency of 30 KHz. In this example, the frequency deviation of the modulated reference clock signal is 0.1 MHz. Further in this example, the modulated reference clock signal 135 has a spread spectrum frequency profile having a substantially triangular shape that varies across the frequency range of 9.95 MHz to 10.05 MHz.

Further, the reference clock signal modulator 130 generates a modulation direction signal 105 indicating a modulation frequency direction of the spread spectrum frequency profile. In various embodiments, a frequency of the spread spectrum frequency profile increases from a lower frequency (e.g., 9.95 MHz) to an upper frequency (e.g., 10.05 MHz) of the frequency range of the spread spectrum frequency profile in a cycle and then decreases from the upper frequency to the lower frequency in the same cycle. Moreover, the cycle of the spread spectrum frequency profile repeats to form a triangular-shaped periodic waveform. In these embodiments, the modulation direction signal 105 indicates the modulation frequency direction of the spread spectrum frequency profile by indicating when the frequency of the spread spectrum frequency profile is increasing and when the frequency of the spread spectrum frequency profile is decreasing.

The phase-lock loop 120 aligns (i.e., locks) a phase of the spread spectrum clock signal 175 with a phase of the modulated reference clock signal 135. In this process, the phase-lock loop 120 generates a loop phase error signal 145 indicating a phase difference between the modulated reference clock signal 135 and the spread spectrum clock signal 175. Further, the phase-lock loop 120 generates a loop charge pump signal 155 indicating the phase difference between the modulated reference clock signal 135 and the spread spectrum clock signal 175. The loop modulator 110 generates a loop modulation signal 115 based on the modulation direction signal 105 and the loop phase error signal 145 for modulating the spread spectrum clock signal 175. Moreover, the phase-lock loop 120 generates a loop oscillation control signal 165 by filtering out higher frequency components in the loop charge pump signal 155 and combining the loop charge pump signal 155 with the loop modulation signal 115. As a result, the spread spectrum clock signal 175 has a frequency profile that is substantially the same as the spread spectrum frequency profile. Moreover, the phase of the spread spectrum clock signal 175 remains substantially aligned with the phase of the modulated reference clock signal 135.

Because the phase of the spread spectrum clock signal 175 remains substantially aligned with the phase of the modulated reference clock signal 135, variation in the loop phase error signal 145 is minimized (e.g., reduced), which minimizes (e.g., reduces) phase jitter in the spread spectrum clock signal 175 in comparison to conventional spread spectrum clock signal generators. Moreover, the phase-lock loop 120 has a loop bandwidth for further minimizing (e.g. reducing) phase jitter in the spread spectrum clock signal 175 without distorting a frequency profile of the spread spectrum clock signal 175. As a result, the frequency profile of the spread spectrum clock signal 175 is substantially the same as the spread spectrum frequency profile.

In various embodiment, the phase-lock loop 120 includes a loop phase detector (Loop PD) 140, a loop charge pump (Loop CP) 150, a loop filter 160, and a loop voltage-controlled oscillator (Loop VCO) 170. The loop phase detector 140 is coupled (e.g., connected) to the reference clock signal modulator 130, the loop modulator 110, and the loop charge pump 150. The loop filter 160 is coupled (e.g., connected) to the loop charge pump 150, the loop modulator 110, and the loop voltage-controlled oscillator 170. Additionally, the loop voltage-controlled oscillator 170 is coupled (e.g., connected) to the loop phase detector 140. The loop phase detector 140 generates the loop phase error signal 145 based on the modulated reference clock signal 135 and the spread spectrum clock signal 175. In this way, the spread spectrum clock signal 175 is a feedback clock signal of the phase-lock loop 120. In other embodiments, the phase-lock loop 120 includes a feedback divider for generating the feedback clock signal by dividing a frequency of the spread spectrum clock signal 175. In these embodiments, the loop phase detector 140 generates the loop phase error signal 145 indicating a phase difference between the modulated reference clock signal 135 and the feedback clock signal. In this way, the loop phase error signal 145 also indicates a phase difference between the modulated reference clock signal 135 and the spread spectrum clock signal 175.

The loop charge pump 150 generates the loop charge pump signal 155 based on the loop phase error signal 145. The loop charge pump signal 155 indicates the phase difference between the modulated reference clock signal 135 and the spread spectrum clock signal 175 (e.g., the feedback clock signal). The loop filter 160 generates the loop oscillation control signal 165 based on the loop charge pump signal 155 and the loop modulation signal 115 by filtering out higher frequency components of the loop charge pump signal 155 and combining the loop charge pump signal 155 with the loop modulation signal 115.

In various embodiments, the loop filter 160 includes a low-pass filter. In this way, the loop filter 160 generates the loop oscillation control signal 165 by filtering out higher frequency components in the loop charge pump signal 155 and combining (e.g. summing) the loop charge pump signal 155 with the loop modulation signal 115. Moreover, the phase-lock loop 120 has a low-pass transfer function from the input at which the phase-lock loop 120 receives the modulated reference clock signal 135 to the output at which the phase-lock loop 120 generates the spread spectrum clock signal 175. In some embodiments, the loop modulation signal 115 injects a current into the loop filter 160 and extracts a current from the loop filter 160 to modify the voltage of the loop oscillation control signal 165.

The loop voltage-controlled oscillator 170 generates the spread spectrum clock signal 175 having a frequency based on the voltage of the loop oscillation control signal 165. Moreover, the spread spectrum clock signal 175 has a frequency profile substantially the same as the spread spectrum frequency profile.

Figure 2:
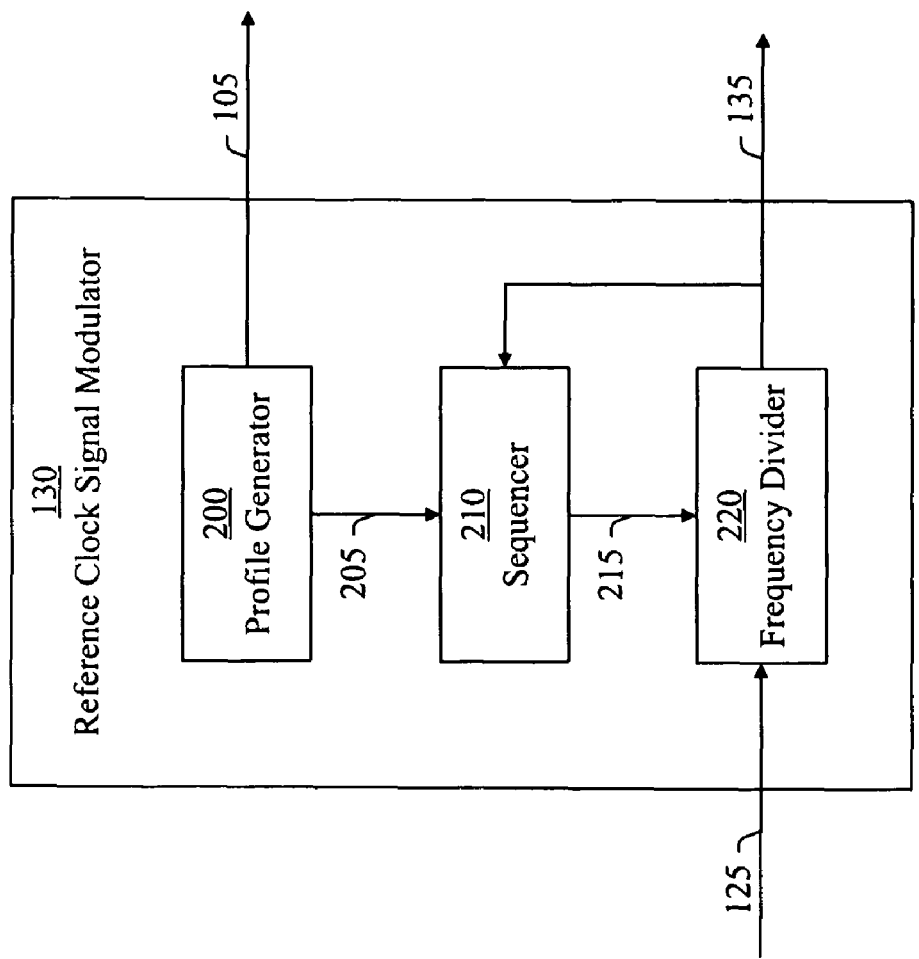
FIG. 2 is a block diagram of a reference clock signal modulator, in accordance with an embodiment of the present invention.

FIG. 2 illustrates the reference clock signal modulator 130, in accordance with an embodiment of the present invention. The reference clock signal modulator 130 includes a profile generator 200, a sequencer 210, and a frequency divider 220. The sequencer 210 is coupled (e.g., connected) to the profile generator 200 and the frequency divider 220. The profile generator 200 generates the modulation direction signal 105 based on the spread spectrum frequency profile. Additionally, the profile generator 200 generates a spread spectrum modulation signal 205 based on the spread spectrum frequency profile. The spread spectrum modulation signal 205 indicates characteristics of the spread spectrum frequency profile. For example, the spread spectrum modulation signal 205 may indicate a modulation frequency direction, a cycle time (period), or a shape of the spread spectrum frequency profile, or some combination thereof. In some embodiments, the modulation direction signal 105 is the same signal as the spread spectrum modulation signal 205. In some embodiments, the spread spectrum modulation signal 205 is a digital signal. For example, the profile generator 200 may include a read-only memory (ROM) storing values representing the spread spectrum frequency profile (e.g., frequency values) and the profile generator 200 may generate the spread spectrum modulation signal 205 including the values stored in the read-only memory.

The sequencer 210 generates a sequencing signal 215 based on the spread spectrum modulation signal 205. The sequencing signal 215 indicates a sequence of divisors for dividing a fundamental frequency of the reference clock signal 125. The frequency divider 220 modulates the reference clock signal 125 based on the sequencing signal 215 by dividing the frequency of the reference clock signal 125 by the sequence of divisors indicated by the sequencing signal 215. In some embodiments, the sequencer 210 also generates the sequencing signal 215 based on the modulated reference clock signal 135. For example, the sequencer 210 may synchronize progression of the divisors in the sequence of divisors based on the modulated reference clock signal 135. In this way, the sequencer 210 synchronizes the sequencing signal 215 with the modulated reference clock signal 135. In various embodiments, the frequency divider 220 is a fractional divider and the sequencer 210 includes a delta-sigma modulator for generating the sequence of divisors in the sequencing signal 215.

Figure 3:
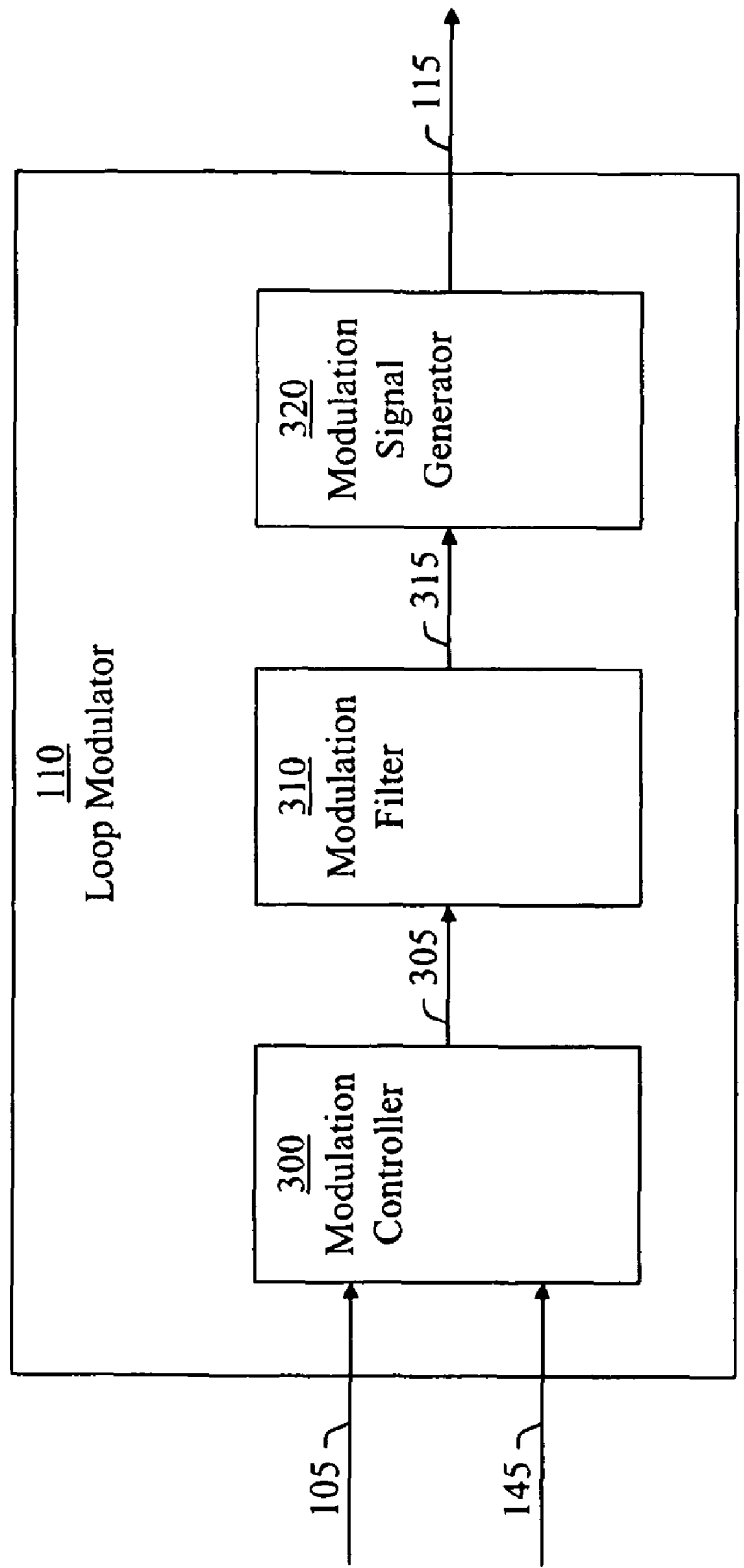
FIG. 3 is a block diagram of a loop modulator, in accordance with an embodiment of the present invention.

FIG. 3 illustrates the loop modulator 110, in accordance with an embodiment of the present invention. The loop modulator 110 includes a modulation controller 300, a modulation filter 310, and a modulation signal generator 320. The modulation filter 310 is coupled (e.g., connected) to the modulation controller 300 and the modulation signal generator 320. The modulation controller 300 generates a phase-modulation error signal 305 based on the modulation direction signal 105 and the loop phase error signal 145. In various embodiments, the phase-modulation error signal 305 indicates a phase-modulation amplitude difference between a phase-modulation amplitude of the modulated reference clock signal 135 and a phase-modulation amplitude of the spread spectrum clock signal 175). Moreover, the phase-modulation error signal 305 indicates a sign and magnitude of the difference between the phase-modulation amplitude of the modulated reference clock signal 135 and the phase-modulation amplitude of the spread spectrum clock signal 175. For example, the phase-modulation error signal 305 may indicate whether the phase-modulation amplitude of the spread spectrum clock signal 175 is less than or greater than the phase-modulation amplitude of the modulated reference clock signal 135 as well as the difference between the phase-modulation amplitude of the spread spectrum clock signal 175 and the modulated reference clock signal 135.

In some embodiments, the phase-modulation error signal 305 indicates a phase difference between the modulated reference clock signal 135 and the spread spectrum clock signal 175 at a peak frequency or a trough frequency of the spread spectrum frequency profile, or both. In this way, the phase-modulation error signal 305 indicates a difference in phase-modulation amplitude between the modulated reference clock signal 135 and the spread spectrum clock signal 175. For example, the phase-modulation error signal 305 may indicate a phase of the spread spectrum clock signal 175 lags a phase of the modulated reference clock signal 135 while the frequency of the modulated reference clock signal 135 is increasing and leads the phase of the modulated reference clock signal 135 while the modulated reference clock signal 135 is decreasing. In this way, the phase-modulation error signal 305 indicates the phase-modulation amplitude of the spread spectrum clock signal 175 is greater than the phase-modulation amplitude of the modulated reference clock signal 135. Moreover, the phase difference between the spread spectrum clock signal 175 and the modulated reference clock signal 135 indicates the phase-modulation amplitude difference between the spread spectrum clock signal 175 and the modulated reference clock signal 135.

The modulation filter 310 generates a modulation control signal 315 by filtering out higher frequency components from the phase-modulation error signal 305. In various embodiments, the modulation filter 310 includes a low-pass filter and the modulation control signal 315 includes a voltage for controlling the modulation signal generator 320. In some embodiments, the modulation filter 310 is an analog filter. In other embodiments, the modulation filter 310 is a digital filter. In various embodiments, the modulation direction signal 105, the loop phase error signal 145, the phase-modulation error signal 305, and the modulation control signal 315 are analog signals. In other embodiments, the modulation direction signal 105, the loop phase error signal 145, the phase-modulation error signal 305, or the modulation control signal 315, or some combination thereof, are digital signals.

The modulation signal generator 320 generates the loop modulation signal 115 based on the modulation control signal 315. In turn, the loop filter 160 modulates the spread spectrum clock signal 175 based on the loop modulation signal 115. As a result, the phase-modulation amplitude difference between the modulated reference clock signal 135 and the spread spectrum clock signal 175 is minimized (e.g., reduced). In this way, the loop modulator 110 equalizes the phase-modulation amplitude of the spread spectrum clock signal 175 to the phase-modulation amplitude of the modulated reference clock signal 135. Moreover, the loop phase detector 140 of the phase-lock loop 120 need not constantly correct for a substantial and constantly changing phase difference between the modulated reference clock signal 135 and the spread spectrum clock signal 175. As a result, variation in the loop phase error signal 145 and the loop charge pump signal 155 are minimized (e.g., reduced), which minimizes (e.g., reduces) phase jitter in the spread spectrum clock signal 175. Moreover, the phase-lock loop 120 has a high-pass transfer function from the input at which the phase-lock loop 120 receives the loop modulation signal 115 to the output at which the phase-lock loop 120 generates the spread spectrum clock signal 175. In this way, the spread spectrum clock signal generator 100 generates the spread spectrum clock signal 175 having a non-distorted frequency profile and low phase jitter. In some embodiments, the loop bandwidth of the phase lock loop 120 from the loop modulation signal 115 to the spread spectrum clock signal 175 is below the fundamental modulation frequency of the modulated reference clock signal 135

In various embodiments, the loop modulation signal 115 includes an injection current that generates a voltage in the loop filter 160. In this way, the injection current in the loop modulation signal 115 modulates the spread spectrum clock signal 175. Moreover, the loop charge pump signal 155 determines a fundamental frequency of the spread spectrum clock signal 175 and the loop modulation signal 115 determines a frequency range of the spread spectrum clock signal 175 about the fundamental frequency of the spread spectrum clock signal 175 (e.g., a modulation frequency range). The voltage generated by the loop modulation signal 115 in the loop filter 160 has an amplitude that varies over a voltage range between a lower voltage and a higher voltage as the injection current of the loop modulation signal 115 various over a current range between a lower current and a higher current. Moreover, the frequency of the spread spectrum clock signal 175 varies over a frequency range between a lower frequency and a higher frequency as the injection current of the loop modulation signal 115 various over the current range.

Figure 4:
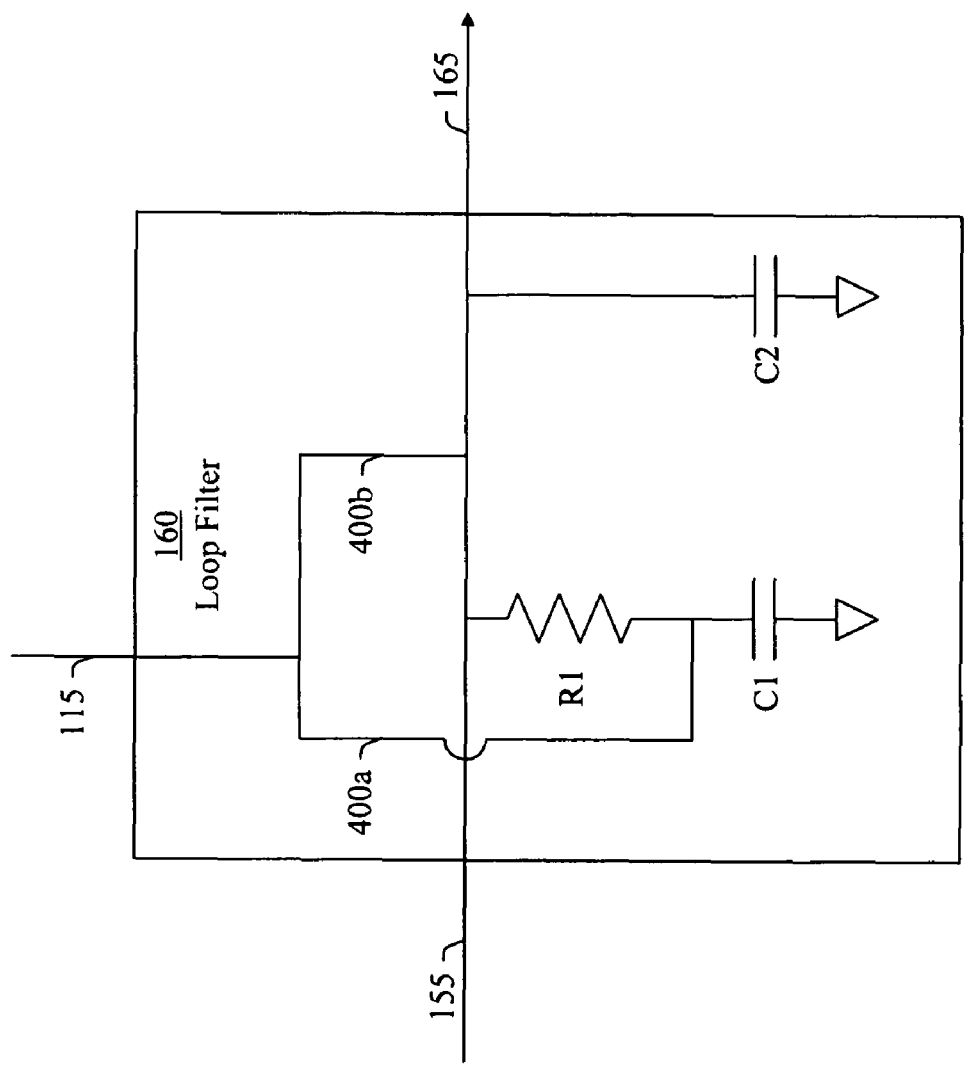
FIG. 4 is a block diagram of a loop filter, in accordance with an embodiment of the present invention.

FIG. 4 illustrates the loop filter 160, in accordance with an embodiment of the present invention. The loop filter 160 includes a resistor R1, a capacitor C1, and a capacitor C2. One end of the capacitor C1 is connected to a ground potential and the other end of the capacitor C1 is connected to one end of the resistor R1. The other end of the resister R1 is connected to one end of the capacitor C2, and the other end of the capacitor C2 is connected to the ground potential.

In this embodiment, the loop modulation signal 115 includes an injection current 400a and an injection current 400b. The loop filter 160 receives the loop charge pump signal 155 and the injection current 400b at a junction at which the resistor R1 is connected to the capacitor C1. Further, the loop filter 160 receives the injection current 400a at a junction at which the resistor R1 is connected to the capacitor C2. Moreover, the loop filter 160 generates the loop oscillation control signal 165 at the junction at which the resistor R1 is connected to the capacitor C2. In various embodiments, the ratio of the injection current 400a to the injection current 400b is the same as the ratio of the capacitance of the capacitor C1 to the capacitance of the capacitor C2.

Figure 5:
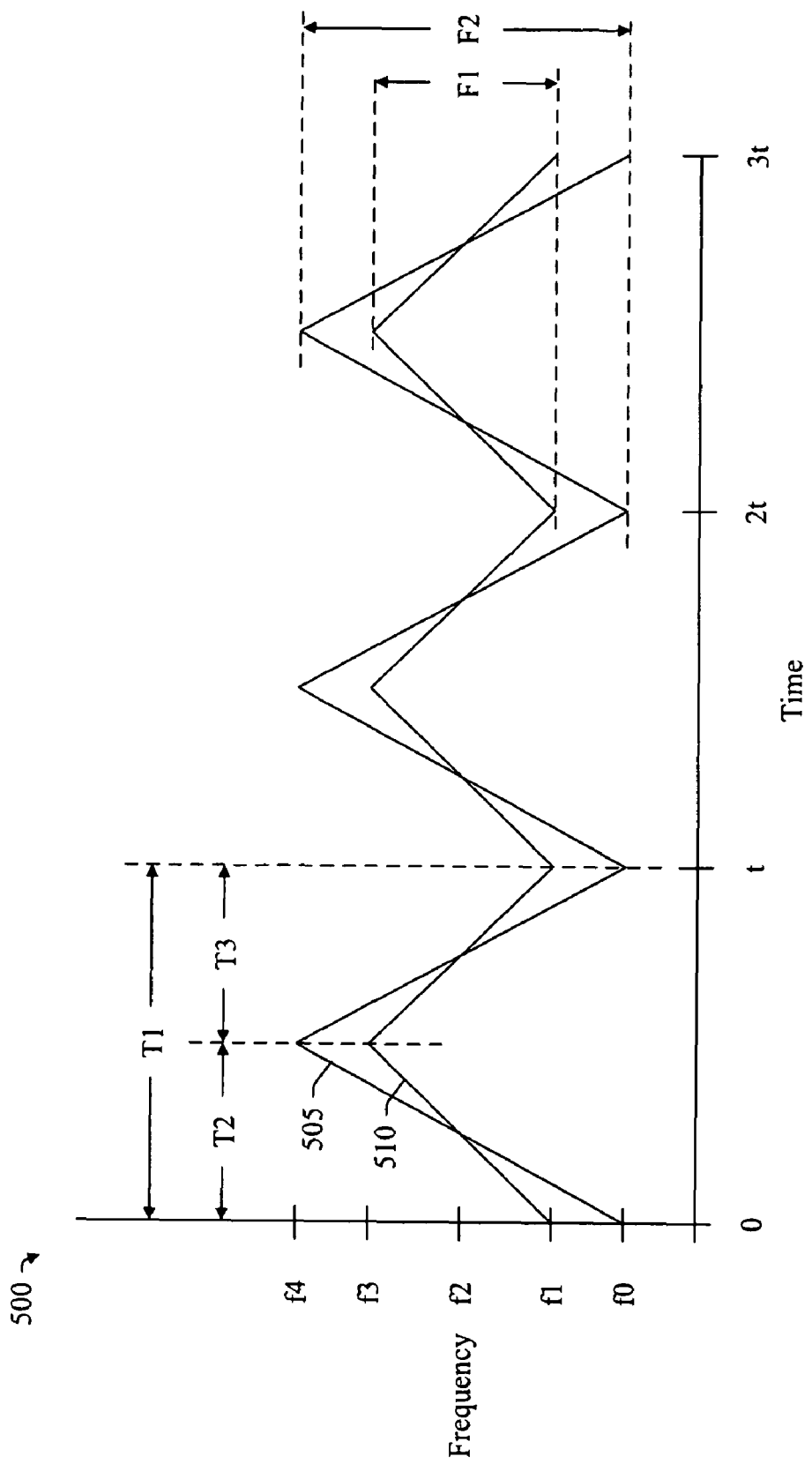
FIG. 5 is a timing diagram of clock frequency profiles, in accordance with an embodiment of the present invention.

FIG. 5 illustrates a timing diagram 500 of clock frequency profiles, in accordance with an embodiment of the present invention. The timing diagram 500 includes an exemplary spread spectrum frequency profile 505 and an exemplary loop frequency profile 510. The spread spectrum frequency profile 505 indicates the frequency of the modulated reference clock signal 135 over time. The loop frequency profile 510 indicates the frequency of the spread spectrum clock signal 175 over time. The spread spectrum frequency profile 505 and the loop frequency profile 510 have a center frequency f2, which is the average frequency of both the reference clock signal 125 and the spread spectrum clock signal 175. In other embodiments, the fundamental frequency of the spread spectrum frequency profile 505 may differ from the fundamental frequency of the loop frequency profile 510, for example if the phase-lock loop 120 includes a feedback divider.

The spread spectrum frequency profile 505 includes periodic cycles in which the frequency of the spread spectrum frequency profile 505 varies across a frequency range over time. Additionally, the loop frequency profile 510 includes periodic cycles in which the frequency of the loop frequency profile 510 varies across a frequency range over time. As illustrated in FIG. 5, the frequency of the spread spectrum frequency profile 505 varies across a frequency range F2 from a lower frequency f0 to an upper frequency f4 over a cycle T1 having a time period t. As also illustrated in FIG. 5, the frequency of the loop frequency profile 510 varies across a frequency range F2 from a lower frequency f1 to an upper frequency f3 over the cycle T1.

The cycle T1 includes a first half-cycle T2 followed by a second half-cycle T3. Each of the half-cycles T2 and T3 has a time period of t/2. In the first half-cycle T2, the frequency of the spread spectrum frequency profile 505 and the frequency of the loop frequency profile 510 increase linearly. In the second half-cycle T3, the frequency of the spread spectrum frequency profile 505 and the frequency of the loop frequency profile 510 decrease linearly. Moreover, the spread spectrum frequency profile 505 and the loop frequency profile 510 are triangular-shaped and oscillate about the center frequency f2. As illustrated in FIG. 5, the frequency range F2 of the spread spectrum frequency profile 505 is greater than the frequency range F1 of the loop frequency profile 510. Moreover, the fundamental modulation frequency of the spread spectrum frequency profile 505 and the loop frequency profile 510 is the reciprocal of the time period t (i.e., 1/t).

Figure 6:
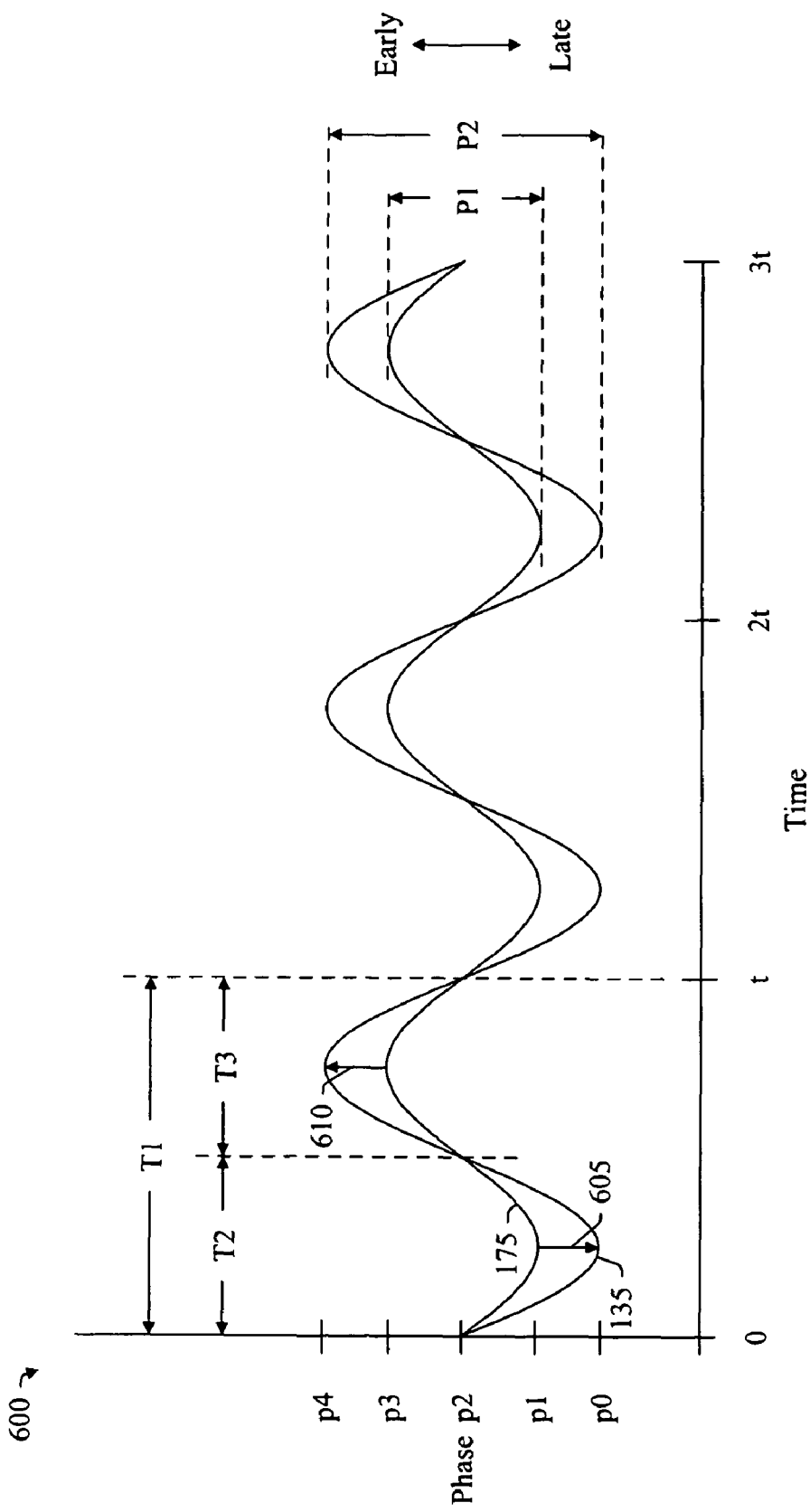
FIG. 6 is a timing diagram of clock phase signals, in accordance with an embodiment of the present invention.

FIG. 6 illustrates a timing diagram 600 of clock phase signals, in accordance with an embodiment of the present invention. The timing diagram 600 includes an exemplary modulated reference clock signal 135 and an exemplary spread spectrum clock signal 175. The modulated reference clock signal 135 has the spread spectrum frequency profile 505 of FIG. 5 and the spread spectrum clock signal 175 has the loop frequency profile 510 of FIG. 5. The phase of the spread spectrum clock signal 175 varies across a phase-modulation amplitude P1 over the cycle T1. The phase-modulation amplitude P1 includes a center phase p2 and varies about the center phase p2 from a lower phase p1 to an upper phase p3. The phase of the modulated reference clock signal 135 varies across a phase-modulation amplitude P2 over the cycle T1. The phase-modulation amplitude P2 includes the center phase p2 and varies about the center phase p2 from a lower phase p0 to an upper phase p4.

As illustrated in FIG. 6, the phase-modulation amplitude P1 of the spread spectrum clock signal 175 is less than the phase-modulation amplitude P2 of the modulated reference clock signal 135. Further, the difference in phase between the modulated reference clock signal 135 and the spread spectrum clock signal 175 has a phase difference 605 in the first half-cycle T2 and a phase difference 610 in the second half-cycle T3. As indicated by the direction of the arrow representing the phase difference 605 in the first half-cycle T2, the phase of the modulated reference clock signal 135 lags the phase of the spread spectrum clock signal 175 when the frequencies of the modulated reference clock signal 135 and the spread spectrum clock signal 175 are increasing. As indicated by the direction of the arrow representing the phase difference 610 in the second half-cycle T3, the phase of the modulated reference clock signal 135 leads the phase of the spread spectrum clock signal 175 when the frequencies of the modulated reference clock signal 135 and the spread spectrum clock signal 175 are decreasing.

Because the phase-modulation amplitude P1 of the spread spectrum clock signal 175 is less than the phase-modulation amplitude P2 of the modulated reference clock signal 135, the loop modulator 110 generates the loop modulation signal 115 to increase the phase-modulation amplitude P1 of the spread spectrum clock signal 175 until the phase-modulation amplitude P1 of the spread spectrum clock signal 175 is substantially the same as the phase-modulation amplitude P2 of the modulated reference clock signal 135. For example, the loop modulator 110 may increase the injection current in the loop modulation signal 115 to increase the phase-modulation amplitude P1 of the spread spectrum clock signal 175. In this way, the loop modulator 110 equalizes the phase-modulation amplitude P1 of the spread spectrum clock signal 175 to the phase-modulation amplitude P2 of the modulated reference clock signal.

As may be envisioned from FIG. 6, increasing the phase-modulation amplitude P1 of the spread spectrum clock signal 175 minimizes (e.g., reduces) the phase difference 605 and the phase difference 610 between the modulated reference clock signal 135 and the spread spectrum clock signal 175. In this way, the phase difference between the modulated reference clock signal 135 and the spread spectrum clock signal 175 is minimized (e.g., reduced), which minimizes (e.g., reduces) jitter in the spread spectrum clock signal 175. Moreover, the spread spectrum clock signal 175 attains the spread spectrum frequency profile 505.

Figure 7:
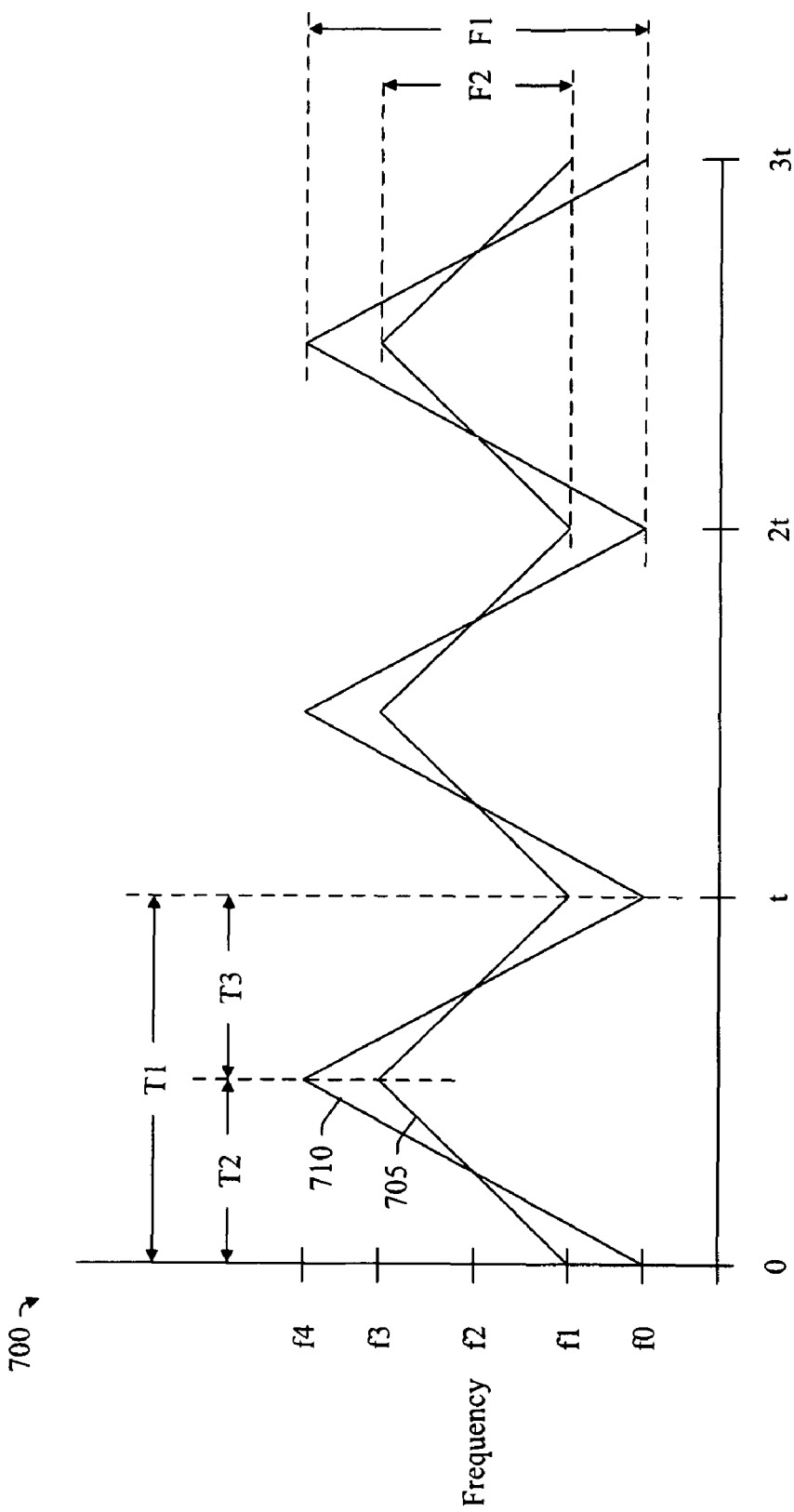
FIG. 7 is a timing diagram of clock frequency profiles, in accordance with an embodiment of the present invention.

FIG. 7 illustrates a timing diagram 700 of clock frequency profiles, in accordance with an embodiment of the present invention. The timing diagram 700 includes an exemplary spread spectrum frequency profile 705 and an exemplary loop frequency profile 710. The spread spectrum frequency profile 705 indicates the frequency of the modulated reference clock signal 135 over time. The loop frequency profile 710 indicates the frequency of the spread spectrum clock signal 175 over time. The spread spectrum frequency profile 705 and the loop frequency profile 710 have a center frequency f2, which is the fundamental frequency of the modulated reference clock signal 135 and the spread spectrum clock signal 175. In other embodiments, the fundamental frequency of the spread spectrum frequency profile 705 may differ from the fundamental frequency of the loop frequency profile 710, for example if the phase-lock loop 120 includes a feedback divider.

The spread spectrum frequency profile 705 includes periodic cycles in which the frequency of the spread spectrum frequency profile 705 varies across a frequency range over time. Additionally, the loop frequency profile 710 includes periodic cycles in which the frequency of the loop frequency profile 710 varies across a frequency range over time. As illustrated in FIG. 7, the frequency of the spread spectrum frequency profile 705 varies across a frequency range F2 from a lower frequency f1 to an upper frequency f3 over a cycle T1 having a time period t. As also illustrated in FIG. 7, the frequency of the loop frequency profile 710 varies across a frequency range F1 from a lower frequency f0 to an upper frequency f4 over the cycle T1.

The cycle T1 includes a first half-cycle T2 followed by a second half-cycle T3. Each of the half-cycles T2 and T3 has a time period of t/2. In the first half-cycle T2, the frequency of the spread spectrum frequency profile 705 and the frequency of the loop frequency profile 710 increase linearly. In the second half-cycle T3, the frequency of the spread spectrum frequency profile 705 and the frequency of the loop frequency profile 710 decrease linearly. Moreover, the spread spectrum frequency profile 705 and the loop frequency profile 710 are triangular-shaped and oscillate about the center frequency f2. As illustrated in FIG. 7, the frequency range F2 of the spread spectrum frequency profile 705 is less than the frequency range F1 of the loop frequency profile 710. Moreover, the fundamental modulation frequency of the spread spectrum frequency profile 705 and the loop frequency profile 710 is the reciprocal of the time period t (i.e., 1/t).

Figure 8:
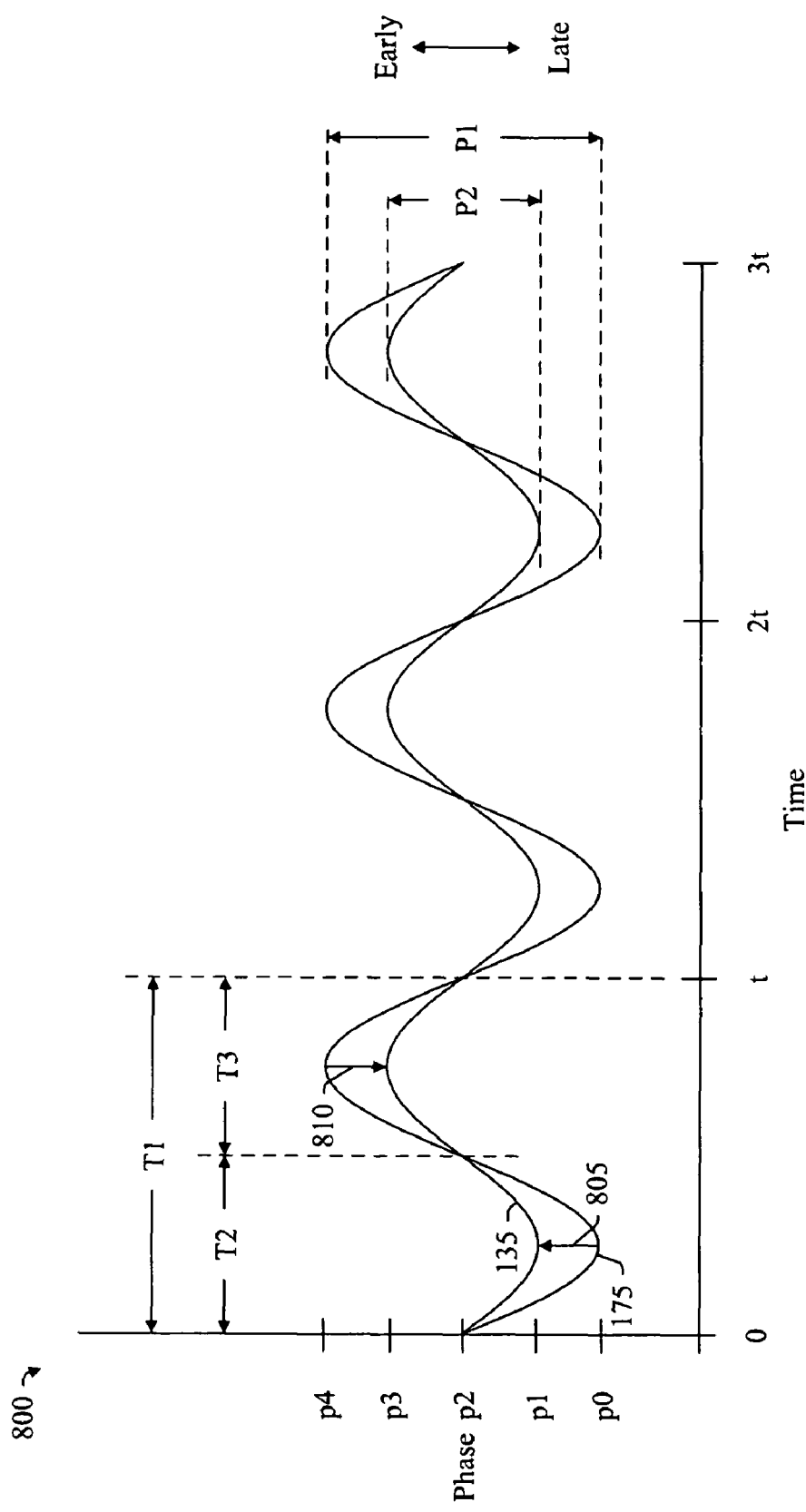
FIG. 8 is a timing diagram of clock phase signals, in accordance with an embodiment of the present invention.

FIG. 8 illustrates a timing diagram 800 of clock phase signals, in accordance with an embodiment of the present invention. The timing diagram 800 includes an exemplary modulated reference clock signal 135 and an exemplary spread spectrum clock signal 175. The modulated reference clock signal 135 has the spread spectrum frequency profile 705 of FIG. 7 and the spread spectrum clock signal 175 has the loop frequency profile 710 of FIG. 7. The phase of the spread spectrum clock signal 175 varies across a phase-modulation amplitude P1 over the cycle T1. The phase-modulation amplitude P1 includes a center phase p2 and varies about the center phase p2 from a lower phase p0 to an upper phase p4. The phase of the modulated reference clock signal 135 varies across a phase-modulation amplitude P2 over the cycle T1. The phase-modulation amplitude P2 includes the center phase p2 and varies about the center phase p2 from a lower phase p1 to an upper phase p3.

As illustrated in FIG. 8, the phase-modulation amplitude P1 of the spread spectrum clock signal 175 is greater than the phase-modulation amplitude P2 of the modulated reference clock signal 135. Further, the difference in phase between the modulated reference clock signal 135 and the spread spectrum clock signal 175 has a phase difference 805 in the first half-cycle T2 and a phase difference 810 in the second half-cycle T3. As indicated by the direction of the arrow representing the phase difference 805 in the first half-cycle T2, the phase of the spread spectrum clock signal 175 lags the phase of the modulated reference clock signal 135 when the frequencies of the modulated reference clock signal 135 and the spread spectrum clock signal 175 are increasing. As indicated by the direction of the arrow representing the phase difference 810 in the second half-cycle T3, the phase of the spread spectrum clock signal 175 leads the phase of the spread modulated reference clock signal 135 when the frequencies of the modulated reference clock signal 135 and the spread spectrum clock signal 175 are decreasing.

Because the phase-modulation amplitude P1 of the spread spectrum clock signal 175 is greater than the phase-modulation amplitude P2 of the modulated reference clock signal 135, the loop modulator 110 adjusts the loop modulation signal 115 to decrease the phase-modulation amplitude P1 of the spread spectrum clock signal 175 until the phase-modulation amplitude P1 of the spread spectrum clock signal 175 is substantially the same as the phase-modulation amplitude P2 of the modulated reference clock signal 135. For example, the loop modulator 110 may decrease the injection current in the loop modulation signal 115 to decrease the phase-modulation amplitude P1 of the spread spectrum clock signal 175. In this way, the loop modulator 110 equalizes the phase-modulation amplitude P1 of the spread spectrum clock signal 175 to the phase-modulation amplitude P2 of the modulated reference clock signal.

As may be envisioned from FIG. 8, decreasing the phase-modulation amplitude P1 of the spread spectrum clock signal 175 minimizes (e.g., reduces) the phase difference 805 and the phase difference 810 between the modulated reference clock signal 135 and the spread spectrum clock signal 175. In this way, the phase difference between the modulated reference clock signal 135 and the spread spectrum clock signal 175 is minimized (e.g., reduced), which minimizes (e.g., reduces) jitter in the spread spectrum clock signal 175. Moreover, the spread spectrum clock signal 175 attains the spread spectrum frequency profile 705.

Figure 9:
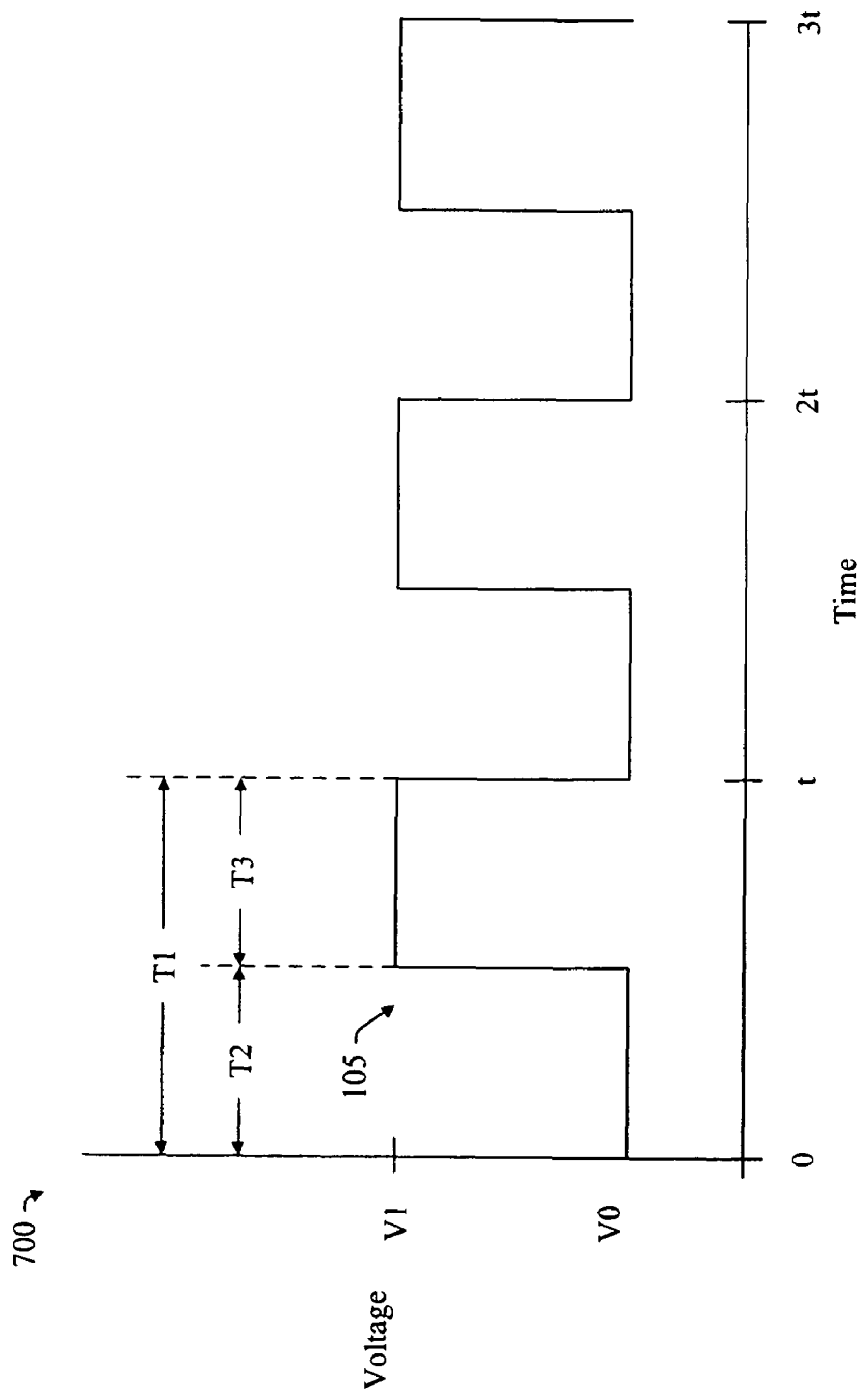
FIG. 9 is a timing diagram of a modulation direction signal, in accordance with an embodiment of the present invention.

FIG. 9 illustrates a timing diagram 900 of the modulation direction signal 105, in accordance with an embodiment of the present invention. As illustrated in the timing diagram 900, the modulation direction signal 105 includes a voltage that varies over the cycle T1. As illustrated in FIG. 9, the modulation direction signal 105 has a voltage V0 throughout the first half-cycle T2 of the cycle T1 and a voltage V1 throughout the second half-cycle T3 of the cycle T1. The voltage V0 indicates that the frequency of the spread spectrum frequency profile (e.g., the spread spectrum frequency profile 505 or 705) is increasing in the first half-cycle T2. The voltage V1 indicates that the frequency of the spread spectrum frequency profile (e.g., the spread spectrum frequency profile 505 or 705) is decreasing in the first half-cycle T2. In various embodiments, the voltage V0 indicates a logic value of zero and the voltage V1 indicates a logic value of one. For example, the lower voltage V0 may be zero volts (0V) and the higher voltage V1 may be five volts (5V).

Figure 10:
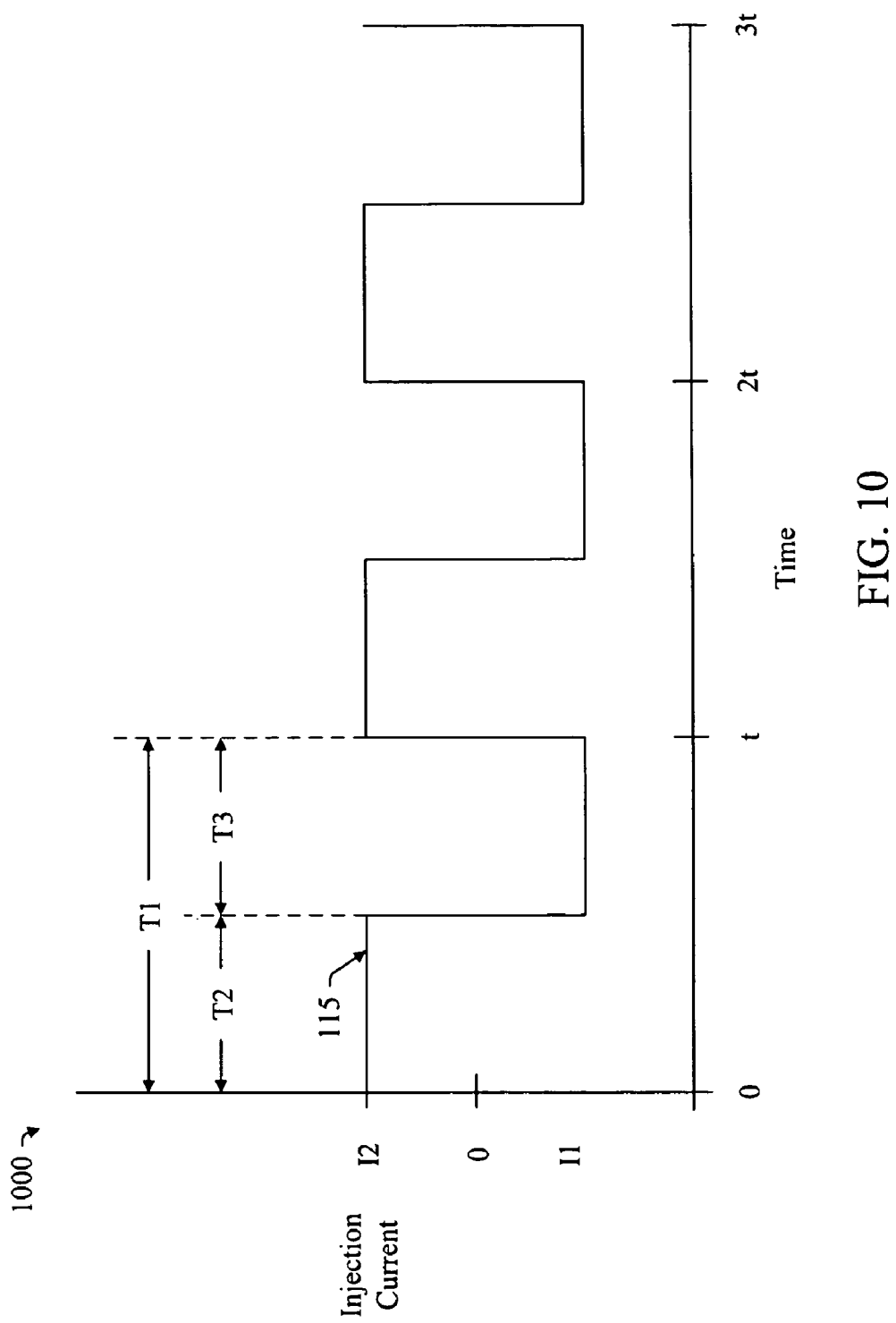
FIG. 10 is a timing diagram of a loop modulation signal, in accordance with an embodiment of the present invention.

FIG. 10 illustrates a timing diagram 1000 of the loop modulation signal 115, in accordance with an embodiment of the present invention. As illustrated in the timing diagram 1000, the loop modulation signal 115 includes an injection current that varies over the cycle T1. As illustrated in FIG. 10, the injection current of the loop modulation signal 115 has a current I2 throughout the first half-cycle T2 of the cycle T1 and a current I1 throughout the second half-cycle T3 of the cycle T1. As illustrated in FIG. 10, the injection current of the loop modulation signal 115 is a positive current I2 in the first half-cycle T2 and a negative current I1 in the second half-cycle T3. Moreover, the amplitude of the injection current in the loop modulation signal 115 determines the phase-modulation amplitude (e.g., P1) of the spread spectrum clock signal 175. In various embodiments, the loop modulator 110 decreases the amplitude of the injection current in the loop modulation signal 115 to decrease the phase-modulation amplitude of the spread spectrum clock signal 175 and increases the amplitude of the injection current in the loop modulation signal 115 to increase the phase-modulation amplitude of the spread spectrum clock signal 175, as is described more fully herein.

Figure 11:
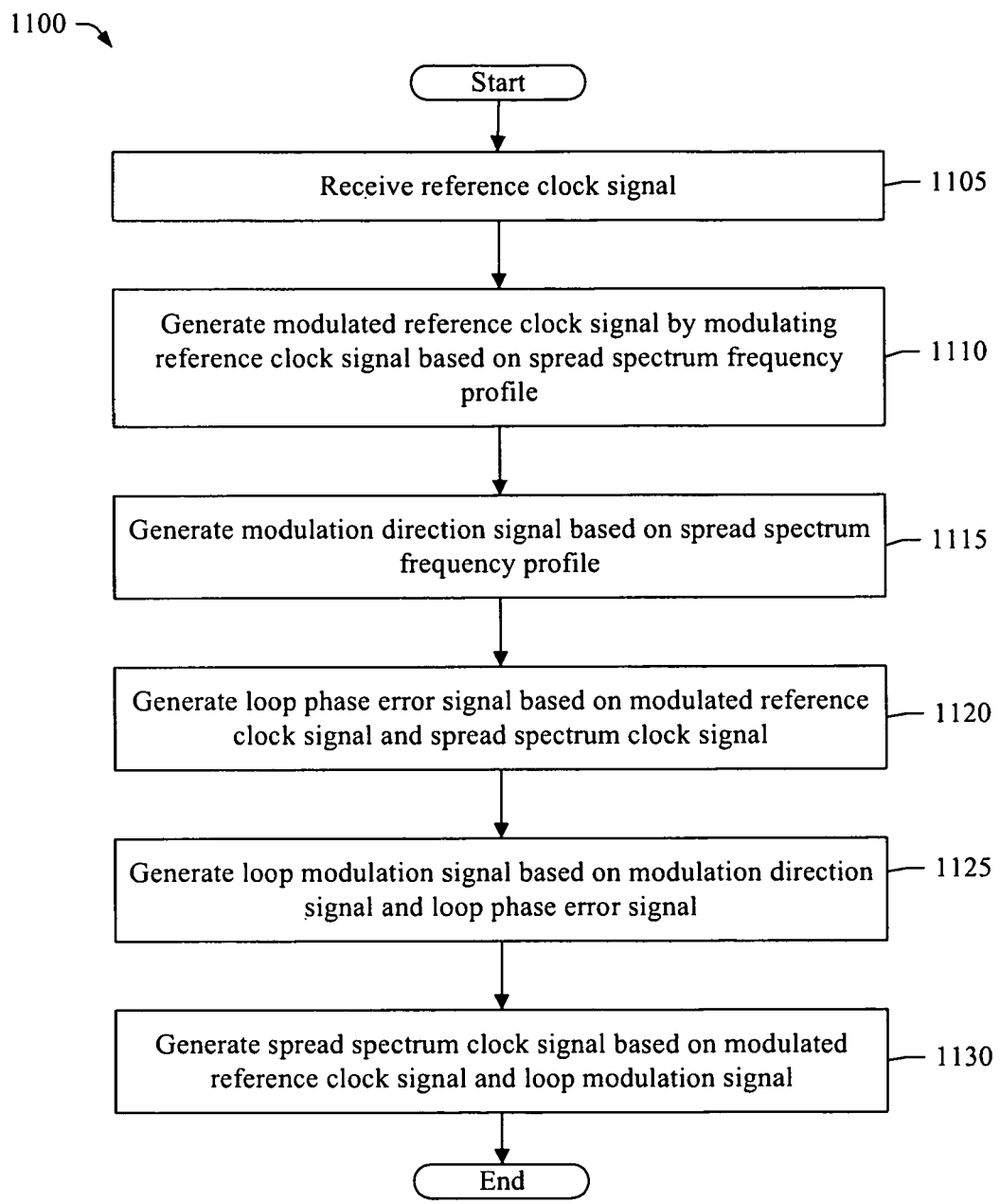
FIG. 11 is a flow chart of a method of generating a spread spectrum clock signal, in accordance with an embodiment of the present invention.

FIG. 11 illustrates a method 1100 of generating a spread spectrum clock signal, in accordance with an embodiment of the present invention. In step 1105, a reference clock signal 125 is received. In various embodiments, the reference clock signal modulator 130 receives the reference clock signal 125. In some embodiments, the reference clock signal modulator 130 generates the reference clock signal 125, for example by using a crystal oscillator clock circuit. The method 1100 then proceeds to step 1110.

In step 1110, a modulated reference clock signal is generated by modulating the reference clock signal based on a spread spectrum frequency profile. In various embodiments, the reference clock signal modulator 130 generates the modulated reference clock signal 135 by modulating the reference clock signal 125 based on a spread spectrum frequency profile (e.g., the spread spectrum frequency profile 505 or 705). Moreover, the modulated reference clock signal 135 includes a frequency having the spread spectrum frequency profile. The method 1100 then proceeds to step 1115.

In step 1115, a modulation direction signal is generated based on the spread spectrum frequency profile. In various embodiments, the reference clock signal modulator 130 generates the modulation direction signal 105 based on the spread spectrum frequency profile (e.g., the spread spectrum frequency profile 505 or 705). The modulation direction signal 105 indicates a modulation frequency direction of the spread spectrum frequency profile. In some embodiments, the profile generator 200 of the reference clock signal modulator 130 generates the modulation direction signal 105 based on the spread spectrum frequency profile. The method 1100 then proceeds to step 1120.

In step 1120, a loop phase error signal is generated based on the modulated reference clock signal and a spread spectrum clock signal. In various embodiments, the phase-lock loop 120 generates the loop phase error signal 145 based on the modulated reference clock signal 135 and the spread spectrum clock signal 175. The loop phase error signal 145 indicates a phase difference between the modulated reference clock signal 135 and the spread spectrum clock signal 175. In some embodiments, the loop phase detector 140 generates the loop phase error signal 145 based on the modulated reference clock signal 135 and the spread spectrum clock signal 175. The method 1100 then proceeds to step 1125.

In step 1125, a loop modulation signal is generated based on the modulation direction signal and the loop phase error signal. In various embodiments, the loop modulator 110 generates the loop modulation signal 115 based on the modulation direction signal 105 and the loop phase error signal 145. The method 1100 then proceeds to step 1130.

In step 1130, a spread spectrum clock signal is generated based on the modulated reference clock signal and the loop modulation signal. In various embodiments, the phase-lock loop 120 generates the spread spectrum clock signal 175 based on the modulated reference clock signal 135 and the loop modulation signal 115. In some embodiments, the loop voltage-controlled oscillator 170 generates the spread spectrum clock signal 175 based on the loop oscillation control signal 165. In this way, the phase-lock loop 120 generates the spread spectrum clock signal 175 based on the modulated reference clock signal 135 and the loop modulation signal 115. The method 1100 then ends.

In various embodiments, the method 1100 may include more or fewer steps than the steps 1105-1130 described above and illustrated in FIG. 11. In some embodiments, one or more of the steps 1105-1130 of the method 1100 may be performed in parallel or substantially simultaneously. In various embodiments, the steps 1105-1130 of the method 1100 may be performed more than once or in a different order than the order described above and illustrated in FIG. 11.

Figure 12:
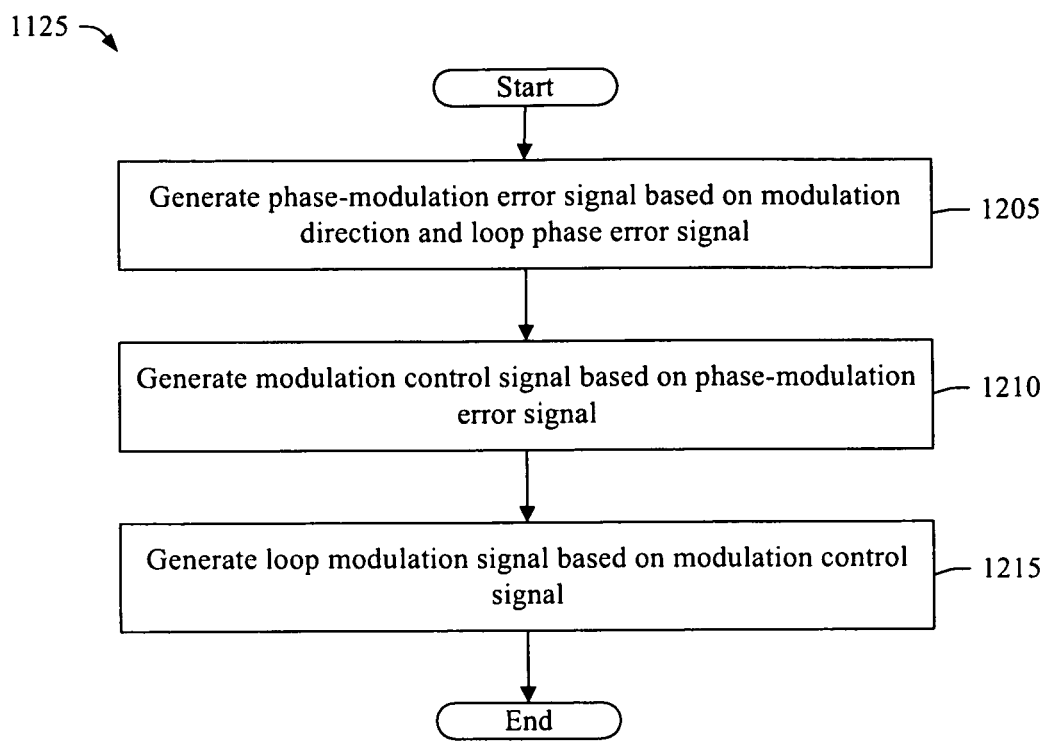
FIG. 12 is a flow chart of a portion of a method of generating a spread spectrum clock signal, in accordance with an embodiment of the present invention.

FIG. 12 illustrates a portion of the method 1100 of generating a spread spectrum clock signal, in accordance with an embodiment of the present invention. The portion of the method 1100 illustrated in FIG. 12 is included in the step 1125 of the method 1100. In step 1205, a phase-modulation error signal is generated based on the modulation direction signal and the loop phase error signal. In various embodiments, the loop modulator 110 generates the phase-modulation error signal 305 based on the modulation direction signal 105 and the loop phase error signal 145. The phase-modulation error signal 305 indicates a difference in phase-modulation amplitude between the modulated reference clock signal 135 and the spread spectrum clock signal 175. In some embodiments, the modulation controller 300 generates the phase-modulation error signal 305 based on the modulation direction signal 105 and the loop phase error signal 145. In various embodiments, the phase-modulation error signal 305 also indicates a difference in phase between the modulated reference clock signal 135 and the spread spectrum clock signal 175 at a selected time (e.g., a predetermined time) or a selected frequency (e.g., a peak frequency or a trough frequency) of the spread spectrum frequency profile. The method 1100 the proceeds to step 1210.

In step 1210, a modulation control signal is generated based on the phase-modulation error signal. In various embodiments, the loop modulator 110 generates the modulation control signal 315 based on the phase-modulation error signal 305. In various embodiments, the modulation filter 310 includes a low-pass filter and the modulation control signal 315 includes a voltage for controlling the modulation signal generator 320. The method 1100 then proceeds to step 1215.

In step 1215, the loop modulation signal is generated based on the modulation control signal. In various embodiments, the loop modulator 110 generates the loop modulation signal 115 based on the modulation control signal 315. In some embodiments, the modulation signal generator 320 of the loop modulator 110 generates the loop modulation signal 115 based on the modulation control signal 315. This portion of the method 1100 then ends.

In various embodiments, the step 1125 of the method 1100 illustrated in FIG. 12 may include more or fewer steps than the steps 1205-1215 described above and illustrated in FIG. 12. In some embodiments, one or more of the steps 1205-

1215 of the method 1100 may be performed in parallel or substantially simultaneously. In various embodiments, the steps 1205-1215 of the method 1100 may be performed more than once or in a different order than the order described above and illustrated in FIG. 12.

In various embodiments, the reference clock signal modulator 130 modulates the reference clock signal 125 with a spread spectrum frequency profile and the phase-lock loop 120 generates the spread spectrum clock signal 175 by locking the phase of the spread spectrum clock signal 175 to the phase of the reference clock signal 135. Moreover, the loop bandwidth of phase-lock loop 120 is selected (e.g., reduced) to achieve a desired attenuation of phase quantization noise generated in the modulated reference clock signal 135 by the reference clock signal modulator 130. Additionally, the loop modulator 110 injects a current into the loop filter 160 of phase locked loop 120 to modulate the spread spectrum clock signal 175 with the spread spectrum frequency profile. In this way, the loop modulator 110 restores any degradation of the spread spectrum frequency profile caused by the selected (e.g., reduced) bandwidth of phase locked loop 120.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A system for generating a spread spectrum clock signal, comprising:
 a reference clock signal modulator configured to generate a modulated reference clock signal by modulating a reference clock signal based on a spread spectrum frequency profile, the reference clock signal modulator further configured to generate a modulation direction signal indicating a modulation frequency direction of the spread spectrum frequency profile;
 a phase-lock loop coupled to the reference clock signal modulator and configured to generate a loop phase error signal indicating a phase difference between the modulated reference clock signal and a spread spectrum clock signal, the phase-lock loop further configured to generate the spread spectrum clock signal based on the modulated reference clock signal and a loop modulation signal; and
 a loop modulator coupled to the reference clock signal modulator and the phase-lock loop, the loop modulator configured to generate the loop modulation signal based on the modulation direction signal and the loop phase error signal for minimizing a phase-modulation amplitude difference between a phase-modulation amplitude of the modulated reference clock signal and a phase-modulation amplitude of the spread spectrum clock signal.

2. The system of claim 1, wherein the spread spectrum frequency profile is triangular-shaped.

3. The system of claim 1, wherein the phase-lock loop is further configured to lock a phase of the spread spectrum clock signal with a phase of the modulated reference clock signal, and minimize the phase-modulation amplitude difference between the phase-modulation amplitude of the modulated reference clock signal and the phase-modulation amplitude of the spread spectrum clock signal.

4. The system of claim 1, wherein the phase-lock loop has a loop bandwidth below a fundamental modulation frequency of the modulated reference clock signal.

5. The system of claim 1, wherein the loop modulation signal comprises an injection current having a square waveform.

6. The system of claim 5, wherein the loop modulator is further configured to increase an amplitude of the injection current if the phase-modulation amplitude of the spread spectrum clock signal is less than the phase-modulation amplitude of the modulated reference clock signal and to decrease the amplitude of the injection current if the phase-modulation amplitude of the spread spectrum clock signal is greater than the phase-modulation amplitude of the modulated reference clock signal.

7. The system of claim 1, wherein the reference clock signal modulator comprises:
 a profile generator configured to generate a spread spectrum profile signal indicating the spread spectrum frequency profile;
 a sequencer coupled to the profile generator and configured to generate a sequencing signal based on the spread spectrum frequency profile signal, the sequencing signal indicating a sequence of divisors for dividing a fundamental frequency of the reference clock signal; and
 a frequency divider coupled to the sequencer, the frequency divider configured to modulate the reference clock signal based on the sequencing signal by dividing the frequency of the reference clock signal by the sequence of divisors indicated by the sequencing signal.

8. The system of claim 1, wherein the loop modulator comprises:
 a modulation controller configured to generate a phase-modulation error signal based on the modulation direction signal and the loop phase error signal, the phase-modulation error signal indicating a phase-modulation amplitude difference between the phase-modulation amplitude of the modulated reference clock signal and the phase-modulation amplitude of the spread spectrum clock signal;
 a modulation filter coupled to the modulation controller and configured to generate a modulation control signal by low-pass filtering the phase-modulation error signal; and
 a modulation signal generator coupled to the modulation filter and configured to generate the loop modulation signal based on the modulation control signal.

9. The system of claim 1, wherein the phase-lock loop comprises:
 a loop phase detector configured to generate the loop phase error signal based on the modulated reference clock signal and the spread spectrum clock signal;
 a loop charge pump coupled to the loop phase detector and configured to generate a loop charge pump signal based on the loop phase error signal, the loop charge pump signal indicating the phase difference between the modulated reference clock signal and the spread spectrum clock signal;
 a loop filter coupled to the loop modulator and the loop charge pump, the loop filter configured to generate a loop oscillation control signal by low-pass filtering the loop charge pump signal and combining the loop charge pump signal with the loop modulation signal; and
 a loop voltage-controlled oscillator coupled to the loop filter and the loop phase detector, the loop filter configured to generate the spread spectrum clock signal based on the loop oscillation control signal.

10. A system for generating a spread spectrum clock signal, the system comprising:

a profile generator configured to generate a spread spectrum profile signal indicating a spread spectrum frequency profile and a modulation direction signal indicating a modulation frequency direction of the spread spectrum frequency profile;

a sequencer coupled to the profile generator and configured to generate a sequencing signal based on the spread spectrum profile signal, the sequencing signal indicating a sequence of divisors for dividing a fundamental frequency of the reference clock signal;

a frequency divider coupled to the profile generator and the sequencer, the frequency divider configured to generate a modulated reference clock signal by dividing a fundamental frequency of the reference clock signal by the sequence of divisors indicated by the sequencing signal;

a loop phase detector coupled to the frequency divider and configured to generate a loop phase error signal indicating a phase difference between the modulated reference clock signal and the spread spectrum clock signal;

a loop modulator coupled to the profile generator and the loop phase detector, the loop modulator configured to generate a loop modulation signal based on the modulation direction signal and the loop phase error signal for minimizing a phase-modulation amplitude difference between a phase-modulation amplitude of the modulated reference clock signal and a phase-modulation amplitude of the spread spectrum clock signal;

a loop charge pump coupled to the loop phase detector and configured to generate a loop charge pump signal based on the loop phase error signal, the loop charge pump signal indicating the phase difference between the modulated reference clock signal and the spread spectrum clock signal;

a loop filter coupled to the loop charge pump and configured to generate a loop oscillation control signal by low-pass filtering the loop charge pump signal and combining the loop charge pump signal with the loop modulation signal; and a loop voltage-controlled oscillator coupled to the loop filter and the loop phase detector, the loop voltage-controlled oscillator configured to generate the spread spectrum clock signal based on the loop oscillation control signal.

11. The system of claim 10, wherein the spread spectrum frequency profile is triangular-shaped.

12. The system of claim 10, wherein the phase-lock loop is further configured to lock a phase of the spread spectrum clock signal with a phase of the modulated reference clock signal and to minimize the phase-modulation amplitude difference between the phase-modulation amplitude of the modulated reference clock signal and the phase-modulation amplitude of the spread spectrum clock signal.

13. The system of claim 10, wherein the phase-lock loop has a loop bandwidth below the fundamental frequency of the modulated reference clock signal.

14. The system of claim 10, wherein the loop modulation signal comprises an injection current having a square waveform.

15. The system of claim 14, wherein the loop modulator is further configured to increase an amplitude of the injection current if the phase-modulation amplitude of the spread spectrum clock signal is less than the phase-modulation amplitude of the modulated reference clock signal and to decrease the amplitude of the injection current if the phase-modulation amplitude of the spread spectrum clock signal is greater than the phase-modulation amplitude of the modulated reference clock signal.

16. The system of claim 14, wherein the loop modulator comprises:

a modulation controller configured to generate a phase-modulation error signal based on the modulation direction signal and the loop phase error signal, the phase-modulation error signal indicating the phase-modulation amplitude difference between the phase-modulation amplitude of the modulated reference clock signal and the phase-modulation amplitude of the spread spectrum clock signal;

a modulation filter coupled to the modulation controller and configured to generate a modulation control signal by low-pass filtering the phase-modulation error signal; and a modulation signal generator coupled to the modulation filter and configured to generate the loop modulation signal based on the modulation control signal.

17. A method of generating a spread spectrum clock signal, the method comprising:

receiving a reference clock signal;

generating a modulated reference clock signal by modulating the reference clock signal based on a spread spectrum frequency profile;

generating a modulation direction signal indicating a modulation frequency direction of the spread spectrum frequency profile;

generating a loop phase error signal indicating a phase difference between the modulated reference clock signal and the spread spectrum clock signal;

generating a loop modulation signal based on the modulation direction signal and the loop phase error signal for minimizing a phase-modulation amplitude difference between a phase of the modulated reference clock signal and a phase of the spread spectrum clock signal; and generating the spread spectrum clock signal based on the modulated reference clock signal and the loop modulation signal.

18. The method of claim 17, wherein the spread spectrum frequency profile is triangular-shaped.

19. The method of claim 17, wherein generating the spread spectrum clock signal comprises locking a phase of the spread spectrum clock signal with a phase of the modulated reference clock signal.

20. The method of claim 17, wherein the loop modulation signal comprises an injection current having a square waveform and generating the loop modulation signal comprises:

increasing an amplitude of the injection current if the phase-modulation amplitude of the spread spectrum clock signal is less than the phase-modulation amplitude of the modulated reference clock signal; and decreasing the amplitude of the injection current if the phase-modulation amplitude of the spread spectrum clock signal is greater than the phase-modulation amplitude of the modulated reference clock signal.

* * * * *